Patented Aug. 18, 1936

2,051,338

UNITED STATES PATENT OFFICE 2,051,338

COMPOSITION OF MATTER

Mone R. Isaacs, Philadelphia, Pa.

No Drawing. Application March 10, 1936, Serial No. 68,118. In Canada July 25, 1934

21 Claims. (Cl. 134—17)

This invention relates to a composition of matter containing as its characteristic ingredients an oleo-resin and at least one substance of the class consisting of proteins, starches and derivatives thereof which is capable of forming a colloidal solution in water. The composition is adapted to be mixed with water, and when so mixed may be used for various purposes in various fields according to the proportion of water employed and which are in all cases characterized by being highly water repellant, possessing great elasticity and strong adhesive properties, and having a long life. The composition may, for example be used for the production of moulded articles, for coating, painting, varnishing or sizing, or as binders, adhesives, or insulators or insulating composition.

The oleo-resin of the composition may, for example, be Canada balsam or a similar oleo-resin obtained from Oregon fir trees, or Peru balsam, while such proteinous substances as casein, soya bean protein, glue and/or such starchy substances as tapioca, peanut meal, dextrin, etc., may be used as the second characteristic ingredient mentioned at the beginning of this description. As additional ingredients the composition will in all cases contain a solvent or thinning agent of various natures such as alcohols, gasoline, sulphonated oils or the like, for the oleo-resin and, if casein is used, an agent such as lime, either quick or slaked, borax, soda ash, sodium silicate, or sodium triphosphate, sodium aluminate, sodium tungstate, ammonium phosphate or other alkalies, for rendering the casein soluble and capable of forming a colloidal solution in water, with or without the addition of a water soluble fluoride, preferably a sodium fluoride, for retarding the quick setting action of the composition when lime is used.

In certain cases it may be found desirable to add to the composition a softening agent which will tend to render more pliable any coating or the like formed from the compound resulting from the mixture of the composition with water. Such a softening agent may be, for example, gasoline, a mineral, vegetable or sulphonated oil, a wax, gum, glycerine, fat or soap, the latter being preferably neutral, and in granular form.

Particularly where an aqua solution of rubber latex or dispersed rubber and/or asphaltum is added to the colloidal mixture, it will be advantageous to add to the mixture with water, previous to use, or even after its application to a surface, a small quantity of hardening or fixing agent tending to facilitate the precipitation of the mixture. Among suitable agents for this purpose are, for example, weak solutions of aldehydes, formaldehydes, aluminate salts particularly such as sodium aluminate, aluminium sulphate, etc., and in some instances accelerators may be added such as sulphur or sulphur compounds such as will liberate free sulphur, sodium poly sulphide, ammonium poly sulphide, lime sulphide and the like. Previous to or after dissolving this composition in water, the hardening and/or precipitating agent may be added to the batch.

It will be understood that in all cases isopropyl alcohol or balsam or its equivalent is used for ensuring the stability and preservation of the mixture in dry or wet state. In addition fillers, colors, clay, minerals, asbestos, mineral wool, fibrous material, or other well known substances, for regulating the liquid gravity of the mixture of the composition with water, etc., may be used in such quantity as required, depending upon the use to which the composition is to be put.

The following are characteristic ingredients of a composition produced according to the present invention:—

Canada balsam and casein and as additional ingredients isopropyl alcohol, lime and sodium fluoride, with or without, as required, an aqua dispersion of rubber latex, dispersed asphaltum, softeners and fixing agents as above referred to, where the use to which the final product is to be put render their presence desirable. While the following description will deal principally with this practical illustration, the invention is not intended to be limited to it.

As the proportion of the various ingredients in the composition may vary within fairly wide limits depending upon the manner of incorporating or mixing the ingredients and the uses to which the composition is to be put, exact proportions or figures for them cannot be given. It may, however, be indicated by way of example that for some uses a composition which for every 100 pounds of dry casein contains the following quantities of other ingredients will be found suitable.

Canada balsam____ From ½ quart to 3 quarts
Isopropyl alcohol__ From ½ quart to 4 quarts
Lime _____ From 3 pounds to 25 pounds
Sodium fluoride___ From 3 pounds to 12½ pounds In making such composition, the Canada balsam is thinned or dissolved with isopropyl alcohol and a relatively small quantity of it is then well mixed into casein which is preferably, though not absolutely necessarily, dry, powdered or granular. By this mixing, the balsam and its thinner or solvent are uniformly distributed over the surfaces of the particles of casein. To the mixture thus formed a quantity of lime is added for the purpose of rendering the casein soluble. In addition to the lime, some sodium fluoride may be incorporated for the purpose of retarding coagulation of the solution when water is subsequently added in such quantity dependent upon the use of the composition. The sodium fluoride may, however, be omitted if the agent for rendering the casein soluble in water is one other than lime. For some purposes the lime may be omitted from this composition and for some purposes the sodium fluoride may be omitted while for some purposes both the lime and sodium fluoride may be omitted. If lime is used it may be desirable to add a softening agent; for instance about 1 quart of mineral oil may be mixed in.

The dry composition formed as above indicated, is a loose dry granular mass which is extremely stable and may be kept for long periods without substantial deterioration. In this connection, it may be stated that the oleo-resin and thinner or solvent incorporated in the composition appear to form a water resistant film on the particles of casein and thus retard any reaction in the presence of moisture between the latter and the agent for rendering it soluble in water.

For various uses the powder may be added to suitable quantities of water for instance 200 to 800 parts of water or more.

Though the composition, even after mixture with water, will remain stable for a long time, owing to the presence of the oleo-resin and isopropyl alcohol or its equivalent which preserves the proteinous or starchy substance from decomposition, it is, of course, usually preferable in order to avoid high transportation costs, etc., not to mix it with water until just before it is to be used. In any case, whenever it is so mixed it forms, after suitable stirring, a smooth homogeneous compound which may be of any desired consistency depending upon the amount of water and fillers, hardening and softening agents and the like, if any, which may be added.

To the liquid composition produced may be added from 100 to 800 pounds of a 40% latex solution. When desired, instead of the rubber solution there may be added a solution containing 25 to 200 pounds of dispersed asphalt. A suitable solvent or dispersing agent for such an asphalt solution is preferably a strong alkali soap.

When desired, appropriate corresponding portions of the dispersed rubber solution and asphaltum solution may be combined and added or may be added separately so that the product may contain rubber or asphaltum or both rubber and asphaltum in proportions varying in accordance with the purpose for which the material is to be used. In some instances hot asphaltum may be added without prior dispersion treatment.

Latex is a natural dispersed rubber. In some instances artificial dispersed rubber may be used to replace latex wholly or in part for some purposes. In one method to produce such an artificial rubber solution or dispersion sheet or crepe rubber may be treated with a solvent or softening agent such for instance as various solvents or mineral oils commonly available for that purpose, the proportions varying according to the quantity needed to dissolve the rubber.

When the aqua composition is applied as an adhesive, size, surface coating, paint or varnish, its water content quickly evaporates after it has been applied and a layer or film is left which, particularly owing to the presence of the oleo-resin, and isopropyl alcohol or its equivalent is highly flexible, elastic and water repellant and, moreover transparent and highly lustrous and is thus admirably adapted as a varnish or lacquer.

As indicated earlier in this specification the uses of the composition are extremely extensive. It may be used for the production of paint, ink, molded or pressed articles, and sealing composition, also for binding fibers to make paper, fibre board, insulators, fabrics and other materials, and for securing the pile of a plush fabric, also for impregnating, moth proofing, and coating fabrics, yarns, felts, floor coverings, gaskets, brake lining, belting and the like, also for uniting plywood, plymetal, metal to plywood, mineral board compositions and all kinds of materials, especially applying to cork, animal, vegetable and mineral fibres, and fibres produced from mineral wool, and for dressing and coating materials such as wire, paper, or leather, as well as for coating, varnishing, sizing and spraying. These uses have been indicated only by way of example of the many possible uses, but from them it will be seen that the composition is of value, in many different arts.

When sulphur and lime are present in the mixture with casein on heating the effect on the composition is somewhat like vulcanizing.

For making insulation and binding fabrics natural cellulose may be added with or without mineral matter such as clay, asbestos or wood flour or cork.

From the above it is apparent that I have provided a dry composition and have described the making of this compound as being performed without the addition of water. However, the invention is not limited to this method. The composition of the invention also may be produced in another manner, i. e. by separately mixing the various ingredients with water, the proportions necessarily regulated based on the quantity of solids used in the aqua batch. This applies to using both wet or dry casein, wet or dry protein, wet or dry starchy substances.

This application is a continuation in part of my application Serial No. 739,125 filed August 9, 1934.

I claim as my invention:
1. A composition of matter containing casein, lime, Canada balsam, isopropyl alcohol, and dispersed rubber.
2. A composition of matter containing casein, lime, Canada balsam, isopropyl alcohol, and an aqua solution of rubber latex.
3. A composition of matter containing casein, lime, an oleo resin, a solvent for the oleo resin, and dispersed rubber.
4. A composition of matter containing casein, lime, Canada balsam, a solvent for the Canada balsam, and an aqua solution of rubber latex.
5. A composition of matter containing casein, lime, an oleo resin, a solvent for the oleo resin, sodium fluoride and dispersed rubber.
6. A composition of matter containing a soya bean protein, a solvent for rendering the soya bean soluble in water, an oleo resin, a solvent for the oleo resin, and an aqua dispersed rubber.
7. A composition of matter containing a soya bean protein, a solvent for rendering the soya beans soluble in water, an oleo resin, a solvent for the oleo resin, and dispersed asphaltum.
8. A composition of matter containing a pro-